June 21, 1966  W. KRAFFT  3,257,131
ARRANGEMENT FOR CONNECTING A YIELDABLE BODY PORTION WITH A
NON-YIELDABLE BODY PORTION
Filed June 12, 1963

United States Patent Office 3,257,131
Patented June 21, 1966

3,257,131
ARRANGEMENT FOR CONNECTING A YIELD-
ABLE BODY PORTION WITH A NON-YIELDABLE
BODY PORTION
Werner Krafft, Heidenheim-Schnaitheim, Germany, assignor to Voith Getriebe K.G., Heidenheim (Brenz), Germany
Filed June 12, 1963, Ser. No. 287,361
Claims priority, application Germany, June 14, 1962,
V 22,639
1 Claim. (Cl. 285—238)

The present invention relates to a tubular connection for detachably interconnecting two conduits in a fluid-tight manner.

With detachable connections of containers and pipes, conduits and the like for gases or liquids with conduit sections of elastic yieldable material, particular attention has to be paid to the fact that such elastic yieldable material is not very wear resistant and is relatively easily plastically deformable. Moreover, said elastic yieldable material has partially a non-homogeneous character, which means that it does not have uniform pressure resistance and is not uniformly deformable. In addition, such elastic yieldable material has the tendency, under the influence of pressure and heat, to become sticky and then to enter a fixed connection with the respective adhesive, or the like.

Efforts have been made to meet the low wear resistance, when employing rotatable clamping means such as box nuts, or the like, by inserting washers of hard, preferably metallic material between the conduit or conduit portion of elastic material and the clamping means, or the clamping means was designed as merely axially displaceable flange means adapted to be tightened in axial direction by screws, or the like. In connection with the last-mentioned arrangement, it has also been known to design the clamping means itself as a multi-section flange the sections of which rest on one hand by means of a web against a preferably annular conduit part, and on the other hand by means of screws, or the like, are pressed against a bead-shaped marginal portion of the conduit part of elastic yieldable material. The said marginal portion was then tightly connected with the above-mentioned preferably annular conduit portion of non-yieldable material. The idea was, by providing the webs at one marginal portion of said sectors, to reduce the danger of exposing the bead-shaped marginal portion of the elastic conduit part to too high a compression stress whereby a plastic deformation might be caused. However, the possibility of exerting too high a compression stress and causing a plastic deformation was also in this instance not completely excluded because a tilting moment about said webs occurs which moment has to be absorbed by the elastic bead-shaped marginal portion. Consequently, with such an arrangement, the clamping means themselves, such as screw nuts or the like, cannot be tightened so as to be self-locking, because there exists the danger that the less resistant material of the elastic conduit portion will undergo a plastic deformation. The clamping means thus also in this instance make necessary the employment of complicated and costly safety means.

As mentioned above, attempts have been made by the provision of washers, and the like to improve the detachability of connections of conduit portions of elastic material. However, in addition to the above-mentioned danger of a plastic deformation, there remained the drawback that the elastic yieldable material, due to its partial non-homogeneity, will, in view of the pressure exerted thereupon, deform differently at different sections so that the said elastic material will partially squeeze out of the range of the washers and, under the influence of pressure, heat, and the like, stick partially to the inner wall of a box nut, or the like so that the latter can be withdrawn only by destroying or damaging the said elastic yieldable material. This damage to the conduit part of elastic yieldable material made necessary the stocking of a great quantity of replacement parts which, of course, is rather costly. Furthermore, the exchange of the conduit parts requires additional labor and frequently caused a temporary stoppage of machines, vehicles, and the like.

It is, therefore, an object of the present invention to provide a tubular connection for detachably interconnecting two conduit parts including a part of elastic yieldable material, in a fluid-tight manner, which will overcome the above-mentioned drawbacks.

It is another object of this invention to provide a detachable connection as set forth in the preceding paragraph which will prevent a permanent deformation of the elastic yieldable conduit part.

It is still another object of this invention to provide a connection as set forth in the preceding paragraphs in which the conduit part of elastic yieldable material is protected against destruction while its connection with a non-yieldable section of a conduit may be tightened in a self-locking manner and may frequently be connected to and disconnected from a conduit section of non-yieldable material in substantially the same manner as is the case with the heretofore known connection of two non-yieldable conduit sections.

These and other objects and advantages of the invention will appear more clearly from the following specification in connection with the accompanying drawing, in which.

Figure 1:
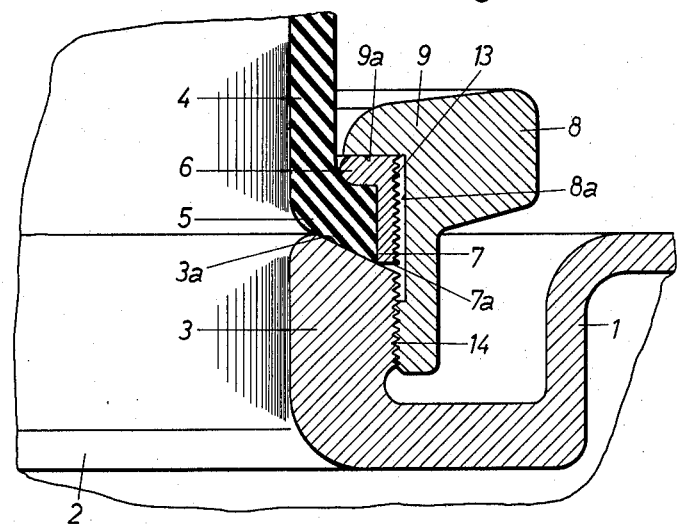
FIGURE 1 is a longitudinal section through an assembled connection according to the present invention.

The problem outlined above in connection with the detachable fluid-tight connection of a conduit section of elastic yieldable material with a conduit section of non-yieldable material such as a pipe, container connection or the like, by means of a clamping member pressing the elastic section against the non-yieldable section, has been solved according to the present invention by the provision of a flanged annular member of non-yieldable material with the flange thereof interposed between the clamping means and that end face of a flange of the elastic conduit connection which faces away from the non-yieldable conduit portion, whereas the cylindrical portion of said flanged annular member surrounds the flange of said elastic conduit section in such a way that in assembled condition of the connection, a permanent deformation of the flange of the elastic conduit part will be impossible.

Referring now to the drawings in detail, the arrangement shown therein comprises a container 1 with an opening 2 in a neck 3 of non-yieldable material such as metal, or the like which is to be connected in a fluid-tight manner with a conduit section 4 of elastic yieldable material. To this end, the conduit section 4 is at that end thereof which is to be connected to the neck 3 provided with a flange-like widening portion 5. Advantageously, the outer end face of the neck 3 and the lower end face of the flange portion 5 to be connected to neck 3 are complementary to each other and so designed as to be self-centering, which means that one of the two parts will have the contour of an outer cone while the other of the two parts will have the contour of an innner cone. Advantageously, the elastic conduit section 4 has its outer end face in flange portion 5 designed as an inner cone, as shown in the drawing, because in this way the flanged portion 5 will, when tightening the connection, be forced to spread radially outwardly into the intermediate ring 6, whereas if the end face of flange portion 5 were designed as an outer cone, the flange portion 5, when tightening the connection could, to some extent, escape radially inwardly.

As will be evident from FIG. 1, the wall of the intermediate ring or flanged annular member 6, 7 which embraces the flange portion 5 has an angle-shaped cross-section. The flanged portion 6 overlies the flange portion 5 of the yieldable conduit section 4 and conveys pressure exerted upon ring 6, 7 by the clamping means 8, 9 onto the flange portion 5 while preventing any contact between the clamping means 8, 9 which, during the installation, has in most instances to be turned, and the wear-resistant surface of the flange portion 5 of the elastic yieldable conduit section 4. This means that the elastic flange portion 5 will engage only non-rotatable parts, whereas when tightening and thereby rotating the clamping means 7, 8—in this instance a box nut—the clamping means will slide on the intermediate ring 6, 7.

Figure 2:
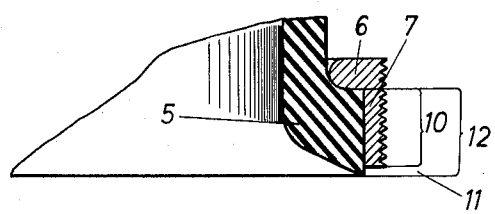
FIGURE 2 is a longitudinal section through a conduit portion of elastic yieldable material in non-compressed condition of said last-mentioned section while the intermediate ring according to the invention is mounted thereon.

The skirt 7 of intermediate ring 6, 7 which is substantially perpendicular to the flanged portion 6, embraces the flange portion 5 and limits the elastic deformation of the latter in radially outward direction. As will be evident from FIG. 1, the flange portion 5 of the elastic conduit section 4 is confined along three surfaces thereof, viz., by the flanged ring portion 6, the skirt 7 and the conical surface area 3a of the neck 3, the portions 6, 7 and 3 consisting of substantially non-yieldable material. As will be evident from FIG. 2 showing the flange 5 in non-compressed condition, the free height 10 of skirt 7 is less than the height 12 of flange portion 5 by the distance 11 than is the case when flange portion 5 is compressed in fully tightened position of the connection shown in FIG. 1. In other words, the distance 11 represents the permissible elastic deformation of flange portion 5. As will also be evident from the drawing, the intermediate ring 7 and the elastic flange portion 5 embraced thereby are by the clamping means 8 pressed against the surface 3a of substantially non-yieldable material of neck portion 3. While in the specific embodiment shown in the drawings the clamping means has been shown as a box nut 8, it is, of course, to be understood that also other clamping means may be employed. In the illustrated example, in which, during the assembly, the clamping means 8, 9 carries out not only an axial displacement but also a rotary movement, it is important, for reasons to be set forth later, that the engaging surface 9a of the nut flange 9 which engages the flanged portion 6 of the intermediate ring 6, 7 is considerably wider than the end face 7a of skirt 7 which engages the surface 3a of neck 3. According to the present invention, at least that end surface of intermediate ring 6, 7 which is engaged by the surface 9a of nut 8, 9 should be smooth in order to allow an easy sliding of nut 8, 9 on ring 6, 7. In many instances, such smooth surface is also desired for the end face 7a, viz., when the intermediate ring 6, 7 guides itself within the clamping means 8, 9. If a conical surface 3a is provided in conformity with the showing of FIG. 1 so as to allow a self-centering of ring 6, 7, a play may be provided between ring 6, 7 and bore 8a of nut 8.

When the clamping means 8, 9 is designed as box nut, it is advantageous to provide the skirt 7 of intermediate ring 6, 7 with an easy-motion outer thread 13 adapted to be screwed through the inner thread 14 of box nut 8, 9. In this way, intermediate ring 6, 7 and box nut 8, 9 will also, after disconnecting conduit section 4 from neck 3, loosely remain interconnected but if desired, may also be disconnected from each other by unscrewing the parts. In disassembled condition of the connection, a displacement or a loss of the box nut is, therefore, for all practical purposes, impossible. It is, of course, to be understood that the outer peripheral portion of neck 3 is provided with an outer thread for threaded engagement with the inner thread 14.

As will be evident from the above, in view of the arrangement of the intermediate ring member 6, 7 and especially in view of the provision of the flange 6 of said ring member, the advantage will be obtained that the clamping means 8, 9 cannot directly contact the less wear-resistant elastic yieldable material of the conduit portion 4. Therefore, a frictional action on the surface of said conduit portion 4 during the connecting operation of the clamping means 8, 9 will be impossible. Simultaneously, a sticking of the flange portion 5 to the clamping means 8, 9 in view of pressure and heat, cannot occur. Nevertheless, the flange 6 of the intermediate ring member 6, 7 permits the transfer of pressure from the clamping means 8, 9 to the flange portion 5 to a sufficient and admissible extent without subjecting said flange portion 5 to a permanent plastic deformation. This has been made possible by the fact that the skirt 7 of the intermediate ring member 6, 7 has a longitudinal extension which is less by the distance 11 (see FIG. 2) than the height of the flange portion 5 in relaxed condition. The distance 11 corresponds to the permissible elastic deformation of flange portion 5. If the clamping force effecting the said deformation is exceeded when tightening the clamping means 8, 9, the excess force will be absorbed by said skirt 7 and transferred to the neck 3 of non-yieldable material inasmuch as when the flange portion 5 has been compressed to its maximum permissible extent, the end face 7a of said skirt 7 will engage the surface 3a of neck 3. Thus, the clamping connection according to the present invention can, in the same manner as is customary with conduit connections of non-yieldable material only, be tightened so as to be self-locking without running the risk that the conduit portion of elastic yieldable material will undergo a non-permissible plastic deformation.

Due to the fact that flange portion 5 is over its entire circumference embraced by the skirt 7 of intermediate ring member 6, 7, the circumferential surface of the elastic conduit flange portion 5 cannot contact the movable clamping means 8, 9 and stick thereto. Moreover, with the end face 3a of the neck 3 arranged as an outer cone in conformity with FIG. 1, the elastically deformable material can deform only radially outwardly toward ring member 6, 7 and cannot evade laterally so that an intimate and uniform sealing effect will be assured which makes possible the application of higher inner pressures than was possible heretofore.

While it might be possible that after a longer period of use, the flange portion 5 and the intermediate ring member 6, 7 will stick to each other or can be detached from each other only with difficulty, this would in no way affect the detachability of the connection according to the present invention. It will be appreciated that while between skirt 7 of ring member 6, 7 and neck 3—as is evident from FIG. 1—for all practical purposes, only a line contact takes place, whereby a high surface pressure occurs, a wide engaging surface prevails between the flange 9 of the clamping means 8, 9 and the flange 6 of the ring member 6, 7 while, for instance, flange 6 has a smooth surface which makes possible an easy sliding of the parts 6 and 9 on each other. When installing the clamping means 8, 9, thus between skirt 7 and surface area 3a, such a high friction will occur that the intermediate ring member 6, 7 and thereby flange portion 5 and conduit section 4 of elastic yieldable material will remain stationary, and only the clamping means 8, 9 will carry out a relative movement with regard to ring member 6, 7. The same conditions will occur when detaching the clamping connection so that a turning of the ring member 6, 7 and thereby a shearing-off of the conduit portion 4 of elastic yieldable material will be impossible, for all practical purposes.

If the surface 3a is not conically designed, in other words is not self-centering, it may be expedient to provide the outer peripheral surface of skirt 7 with a smooth slidable surface in engagement with the bore wall 8a of the clamping means 8, 9 in order to thereby center ring member 6, 7 within said clamping means 8, 9.

Of course, it is also possible to design the area 3a self-centering and to give the clamping means 8, 9 a different shape, for instance the shape of a smooth flange without centering ledges.

In all the above-mentioned instances, the connection according to the present invention will protect the conduit portion 4 of elastic yieldable material against destruction while making it possible that the connection may be tightened in self-locking manner and may be installed and removed as often as called for without affecting the elastic yieldable material.

It is, of course, to be understood that the present invention is, by no means, limited to the particular construction shown in the drawing, but also comprises any modifications within the scope of the appended claims.

What I claim is:

In combination: a first body having a portion of substantially non-yieldable material and being provided with a first end face, a second body having a flange of elastic yieldable material for connection with said portion of said first body, said flange being provided with a second end face in engagement with said first end face and also being provided with a surface area spaced from and opposite to said second end face, a member of substantially non-yieldable material hugging entirely said surface area on the outer circumferential surface of said flange, said member having an inwardly extending flange portion engaging and overlying said surface area and also having a sleeve portion surrounding said outer circumferential surface of said flange, and clamping means surrounding said member and having a first portion for engagement and connection with said substantially non-yieldable portion of said first body and also having a second portion operable to engage and bear upon said inwardly extending flange portion of said member for tightly connecting said flange to said substantially non-yieldable portion of said first body, said sleeve portion of said member being of such axial length that when said sleeve portion is mounted on said flange but prior to compressing the latter, said sleeve portion is spaced from said first end face by the distance equalling the maximum desired compression of said flange, whereas said sleeve portion has that end thereof which is adjacent said first end face of said first body in engagement with said first end face when said first and second bodies are tightly interconnected, whereby the movement of said member and the degree of compression of said flange of elastic yieldable material by said clamping means is limited.

References Cited by the Examiner

UNITED STATES PATENTS

| 545,928 | 9/1895 | Whitmore | 285—348 |
| 1,952,531 | 3/1934 | Campbell | 285—248 |
| 1,982,533 | 11/1934 | Parker | 285—248 |
| 2,413,089 | 12/1946 | Vaught | 285—334.5 X |
| 2,958,545 | 11/1960 | Stelzer | 285—354 |

FOREIGN PATENTS

| 1,289,350 | 2/1962 | France. |
| 771,824 | 4/1957 | Great Britain. |
| 847,721 | 9/1960 | Great Britain. |
| 925,491 | 5/1963 | Great Britain. |

EDWARD C. ALLEN, *Primary Examiner.*